United States Patent [19]

Stirling

[11] Patent Number: 4,648,769

[45] Date of Patent: Mar. 10, 1987

[54] ROUND BALE HANDLER

[76] Inventor: William Stirling, P.O. Box 202, Lower Nicola, British Columbia, Canada, V0K 1Y0

[21] Appl. No.: 605,869

[22] Filed: May 1, 1984

[30] Foreign Application Priority Data

Dec. 14, 1983 [CA] Canada ................................. 443223

[51] Int. Cl.⁴ .............................................. A01D 87/12
[52] U.S. Cl. .............................. 414/24.6; 242/86.5 R; 294/61; 414/665; 414/705; 414/786
[58] Field of Search ...................... 414/24.5, 24.6, 662, 414/663, 665, 666, 669, 670, 672, 684, 687, 705, 721, 723, 786, 911; 242/86.5 R, 86.52; 294/61

[56] References Cited

U.S. PATENT DOCUMENTS

| | | | |
|---|---|---|---|
| 2,271,624 | 2/1942 | Cochran | 414/665 |
| 2,731,164 | 1/1956 | Ulinski | 414/662 |
| 2,817,449 | 12/1957 | Meyer, Jr. et al. | 414/723 |
| 2,914,270 | 11/1959 | Parker et al. | 242/86.5 R |
| 3,916,801 | 11/1975 | Henderson | 414/911 X |
| 3,967,742 | 7/1976 | Meinert | 414/721 X |
| 4,120,405 | 10/1978 | Jones et al. | 414/24.5 |
| 4,249,842 | 2/1981 | Johnson | 414/24.6 X |
| 4,514,127 | 4/1985 | Maier | 414/786 X |

FOREIGN PATENT DOCUMENTS

| | | | |
|---|---|---|---|
| 724904 | 11/1966 | Italy | 414/666 |
| 1214303 | 12/1970 | United Kingdom | 414/666 |

Primary Examiner—Leslie J. Paperner
Attorney, Agent, or Firm—Barrigar & Oyen

[57] ABSTRACT

A round bale handler comprises a frame with a rear member, and a spike. The spike has a pointed front end to penetrate the round bale, and a rear end pivotally connected to the frame so that the spike is swingable between forward and sideways positions. The spike is of a sufficient length such that a front portion of it can penetrate through the axis of the bale and extend substantially along the entire length of it. Stop means are provided for releasably retaining the spike in the forward position and preventing it from swinging beyond each sideways position. A method of using the handler is also disclosed.

25 Claims, 8 Drawing Figures

ROUND BALE HANDLER

FIELD OF THE INVENTION

This invention relates to a round bale handler for use with a prime mover, which allows moving of round bales as well as facilitating unrolling of them.

DESCRIPTION OF THE PRIOR ART

A popular form of bale is known as a round bale, which is cylindrical in shape with a typical diameter of about 4 to 6 feet, a typical length of about 4 to 6 feet, and a typical weight in the vicinity of about 1000 lbs. to 2,000 lbs. Various devices for handling round bales have been described in the past. Such devices include fork lift type devices such as those manufactured by Sperry New Holland (a division of Sperry Corporation), or devices which can be attached to a front end loader, such as those manufactured by Ezee-on Manufacturing Ltd. or disclosed in U.S. Pat. No. 4,329,103 to Miller. Other round bale handling devices include devices whereby the round bale is grasped by the device by means of two opposed, usually hydraulically activated, clamping arms which grasp the bale at opposite ends of the axis thereof thereby clamping the bale between them. Such devices include those disclosed in U.S. Pat. No. 4,280,777 to Gray, U.S. Pat. No. 3,997,069 to McCanse et al, and U.S. Pat. No. 3,968,940 to Godbersen. Other round bale handling devices which utilize spikes which penetrate along the axis of a round bale, are also known. Such devices include those disclosed in the Miller patent, as well as U.S. Pat. No. 4,099,629 to Cox and U.S. Pat. No. 4,084,707 to McFarland. Many of the foregoing devices are relatively complex in construction. In addition, many do not provide any means by which the round bale can be readily unrolled by the device, or where such means is provided, such is typically relatively complex. Such relatively complex unrolling devices are disclosed in the McCanse patent wherein a hydraulic cylinder is required to swing the boom, in the Godbersen patent wherein a separate hydraulically driven rotating drum assists in unrolling the bale, or in the device of U.S. Pat. No. 3,779,208 to Gay which requires an idler roller.

It is also desirable to convert round bales to silage for livestock feeding. This is readily accomplished by drawing a large plastic over the round bale and tying such plastic bag closed at the opening. In order to accomplish the foregoing though, the round bale must be elevated off the ground so that the bag can be drawn over the bale. A round bale handling device utilizing a spike as described, is particularly useful to assist in the foregoing process. However, the difficulty with the round bale handling devices described which utilize a spike, is that because of their construction, it is difficult to have reasonably clear access to the end of the bale closest to the prime mover so that the plastic bag can be drawn completely thereover. Thus bagging becomes relatively difficult with such devices.

It is desirable then, to have a round bale handling device which can transport a round bale, and can also be utilized to unroll it, and which is relatively simple in construction. In addition, it is desirable that such device enable a plastic bag to be relatively readily drawn over the end of a bale carried by the device which is nearest the prime mover.

SUMMARY OF THE INVENTION

The present invention provides a round bale handler for use with a prime mover. The handler comprises a frame having a rear member, and a spike. The spike has a pointed front portion to readily penetrate the round bale. A rear portion of the spike is pivotally connected to the frame so that the spike is swingable between a forward position parallel with the normal direction of travel of the prime mover when the frame is connected to such prime mover, and at least one sideways position substantially 90° from the forward position. A stop means is mounted on the frame for releasably retaining the spike in the forward position, and preventing movement of the spike rearward of the sideways position. The spike is of a sufficient length such that the forward portion of it can penetrate through the axis of the bale and extend substantially along the entire length of it. The bale handler additionally comprises a bale keeper, movable along the rear portion of the spike, and which extends radially from the spike so as to restrain rearward movement of a bale on the front portion of the spike and abutting the bale keeper. In such case, a keeper retainer is positioned and constructed so as to releasable retain the bale keeper in an extended and a retracted position along the rear portion of the spike. In either the extended or retracted position of the keeper retainer, a bale can be retained on the spike abutting the bale keeper.

A support arm is preferably provided, which is pivotally connected to an upper end of said frame, and extends and is connected to, the rear portion of the spike. The support arm is to provide upward and downward support for the spike.

The support arm is usefully connected between an upper end of the frame and the rear portion of the spike. Furthermore, the extended and retracted positions of the bale keeper are positioned forward of the support arm. In addition, the spike is preferably swingable between the forward position and opposite first and second sideway positions each substantially 90° from the forward position. Further, the retracted position is preferably adjacent a forward end of the support arm.

The bale keeper can usefully be constructed to extend a distance below the spike which is less than that which it extends above and sideways of the spike, and with a lower upcurving edge. Further, the bale keeper can be in the form of a plate provided with one or more sighting openings therethrough.

In an alternate embodiment, the handler is again preferably constructed so that the spike can swing to two sideways positions, each substantially 90° from the forward position.

The frame in such embodiment is usefully additionally provided with an upper guide connected to the rear member of the frame and disposed forward and sideways of the rear member, at a position above the plane in which the spike swings and between the rear and the front ends of the spike, so as to provide upward support for the spike when the frame is connected to the prime mover and the spike is in the forward or sideways positions or therebetween.

Alternatively, the frame is provided with a pair of spaced parallel guides connected to the rear member of the frame and disposed forward and sideways of it at positions adjacent respective sides of the plane in which the spike swings, and between the rear and front ends of the spike. The foregoing is so as to provide upward and downward support for the spike when the frame is connected to the prime mover and the spike is in the forward or sideways positions or therebetween. A wheel is usefully additionally provided which is rotatably mounted on the spike between the pair of guides when such are used, the guides in such case being spaced apart a distance slightly greater than the diameter of the wheel so that the wheel can roll freely on either guide when the spike swings.

In either the preferred or alternate embodiment, two brackets can be usefully additionally provided, which brackets can be releasably positioned at any of a plurality of positions along a rear end of the frame. The brackets are adapted to connect the frame to an implement on the prime mover.

The stop means provided in the preferred or alternate embodiments described, can usefully additionally releasably retain the spike in each of the sideways positions.

A method of loading and unrolling a round bale utilizing the above apparatus is also described.

DRAWINGS

Embodiments of the invention will now be described in detail with reference to the drawings in which.

DETAILED DESCRIPTION OF EMBODIMENTS OF THE INVENTION

Figure 1:
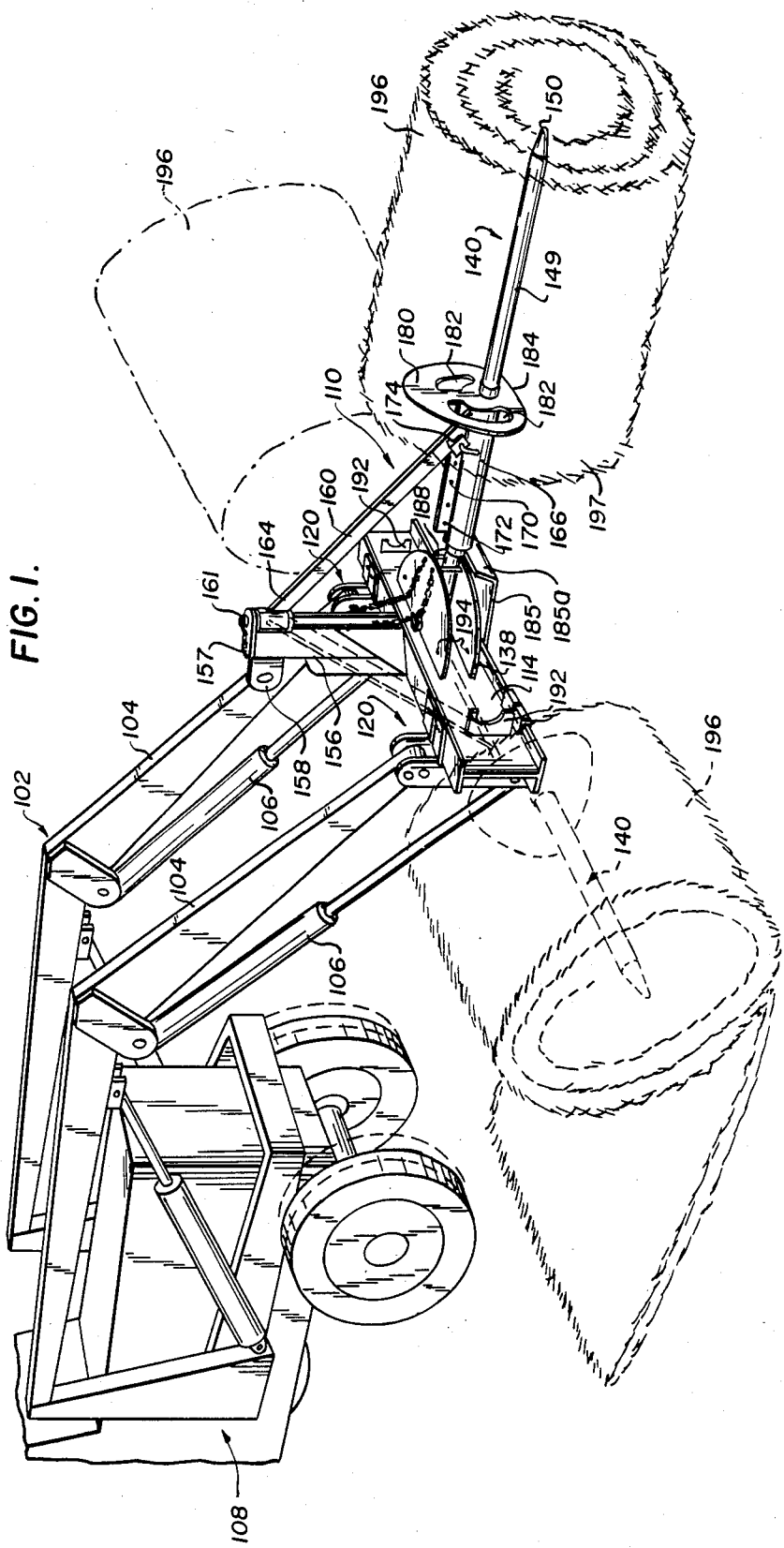
FIG. 1 is a perspective view of the preferred embodiment of the round bale handler of the present invention, showing the handler attached to an implement, namely a front end loader, in turn attached to a prime mover, namely a tractor.

The preferred embodiment of the round bale handler of the present invention, will now be described with reference to FIGS. 1 through 5. FIG. 1 shows the handler 110 attached to a front end of lift arms 104 and tilt arms 106 of an implement, namely a front end loader 102. The front end loader is in turn attached at its rear end to a prime mover, namely a tractor 108. It should be noted at this point that terms such as front, rear, upward, downward, or the like will be used as relative terms throughout this application, and are used particularly with reference to the round bale handler device when connected through an implement or the like to a prime mover.

Handler 110 is constructed of a frame which includes a rear member, in particular I-beam 114. I-beam 114 includes parallel webbings 115 interconnected by webbing 116. The rear member also includes a reinforcing plate 117 centrally disposed on a rear side of I-beam 114, and connected between parallel webbings 115.

Two brackets 120 are slidably mounted on I-beam 114. Each bracket 120 consists of two sections 120a and 120b. Each section 120a and 120b of each bracket 120 has a bottom portion 122 and interconnected flanged portion 130 which extends around the lower webbing 115, thereby retaining each section 120a and 120b on I-beam 114. Each section 120a and 120b further includes a top surface 124 provided with an elongated slot 123 therein. Slot 123 is alignable with a corresponding slot (not shown) in the upper webbing 115 of I-beam 114, such that bolts 136 may be passed through a portion of respective slots 123 in each section 120a and 120b, and a portion of such slot in upper webbing 115, when each section 120a and 120b is slidably positioned at any of a plurality of positions along I-beam 114. By such an arrangement each section 120a and 120b of each bracket 120, can be independently slid toward and away from one another along I-beam 114 to connect to arms of varying width of respective implements. Furthermore, each of the bracket 120 can then be positioned at any of a plurality of positions along I-beam 114 and be releasably retained in such position by bolts 136.

Each bracket 120 further includes a pair of ears 125 connected to respective section 120a and 120b. Each pair of ears 125 is provided with sets of aligned holes at an upper end thereof, as well as sets of such aligned holes at a lower end thereof. The sets of aligned holes can accommodate respective bolts or pins therethrough, so as to attach each bracket 120 to an implement such as front end loader 102 shown in FIG. 1. Typically the upper ends of ears of 125 would be attached by means of bolts or roll pins to the front end of lift arms 104, while the lower ends of ears 125 would be attached in a similar fashion to tilt arms 106, again as illustrated in FIG. 1.

Figure 2:
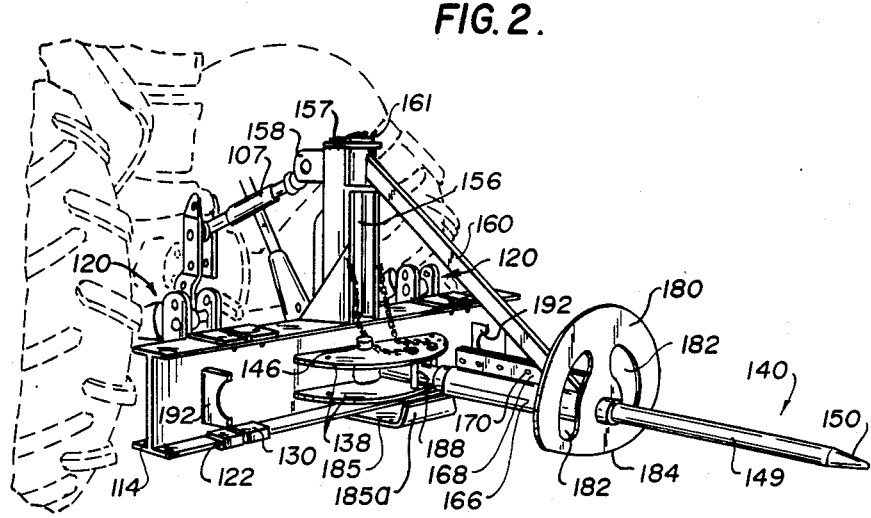
FIG. 2 is a perspective view of the handler of FIG. 1 showing it attached to another implement, namely a 3-point hitch, attached to the rear of the prime mover, again a tractor.
Figure 3:
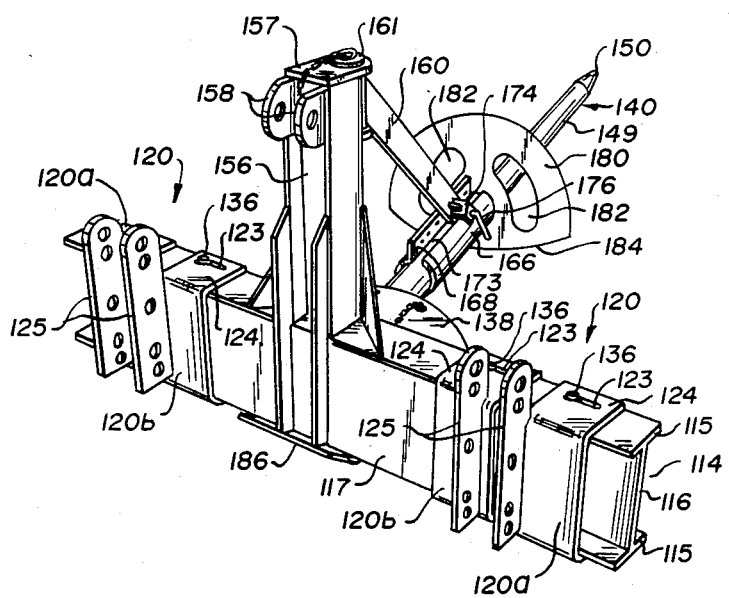
FIG. 3 is a perspective view of the handler of FIG. 1 toward the rear end of it.

Two semi-circular support plates 138 extend forwardly from webbing 116 of I-beam 114, the set of plates 138 being provided with a set of aligned holes so as to accommodate a pivot pin 146 therethrough. A spike 140 is further provided which has a front portion 149 with pointed front end 150, and a rear portion 141, with rear end 142. A rear end 142 of spike 140 further includes a pivot block 144 pivotally mounted upon pivot pin 146. The frame of handler 110 is further provided with an upstanding member 156 connected to I-beam 114. Member 156 has an upper end 157 with a pair of opposed ears 158 thereon, ears 158 being provided with a set of aligned holes in order to connect handler 110 in some cases to an arm of an implement, such as upper arm 107 of a typical 3-point hitch, as shown in FIG. 2. A support arm 160 has a lower, forward end 162 connected by means of welding or the like to rear portion 141 of spike 140. An upper, rear end 164 of support arm 160 is pivotally connected to upper end 157 of member 156 (which represents an upper end of the frame of handler 110), by means of pivot pin 166. Support arm 160 thereby provides upward and downward support for spike 140. By virtue of the foregoing mounting of spike 140, spike 140 is able to swing between a forward position shown in solid lines in FIG. 1, and shown again in FIGS. 2 through 5, and opposed first and second sideways positions each substantially 90° from the forward position, one of which sideways position is shown in broken lines in FIG. 1. By "substantially" 90° is meant an angle of 90° but allowing for a variation of about ±10°.

Figure 4:
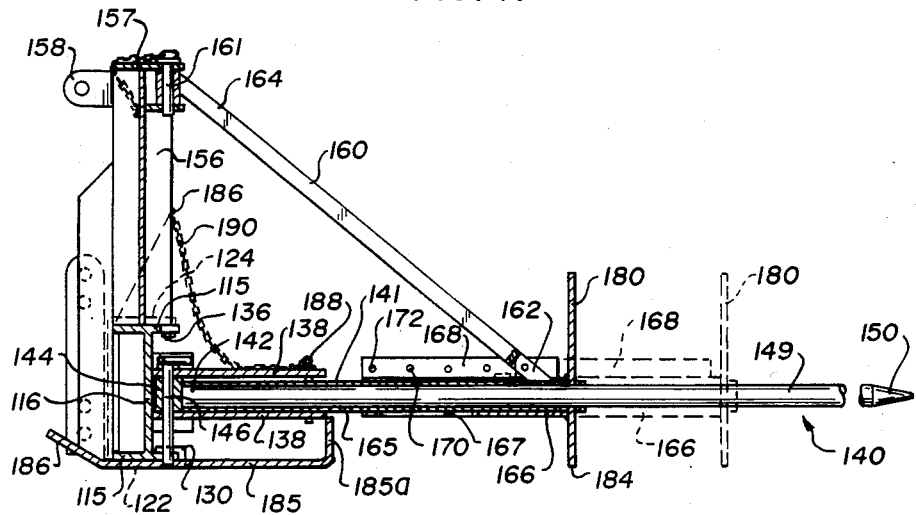
FIG. 4 is a vertical cross section along the length of the handler of FIG. 1.
Figure 5:
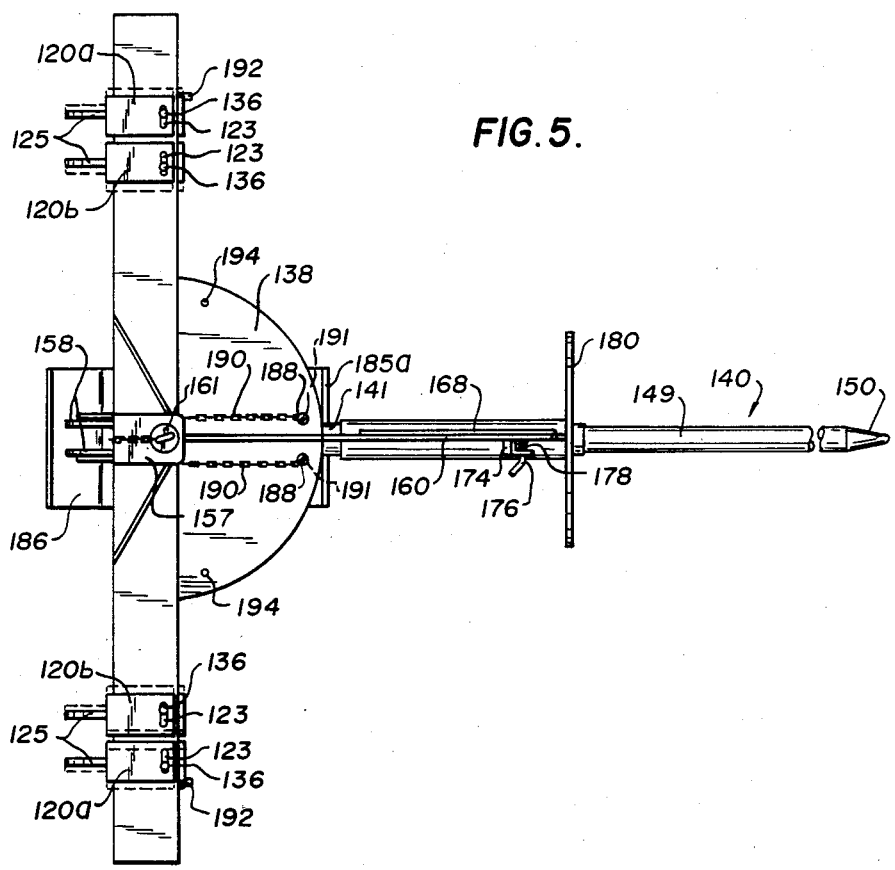
FIG. 5 is a top plan view of the handler of FIG. 1.

A bale keeper 180 is slidably mounted on rear portion 141 of spike 140, and consists of a plate with two sighting openings 182 therethrough. Bale keeper 180 is also dimensioned so as to extend below spike 140 a distance less than that which it extends above and sideways of spike 140. This facet is most clearly seen in FIG. 2. In addition, bale keeper 180 is provided with a lower upcurving edge 184. Bale keeper 180 is slidably mounted on rear portion 141 of spike 140, by virtue of it being welded or otherwise attached to an outer sleeve 166 which is slidable along an inner sleeve 165 positioned about a part of rear portion 141 of spike 140. Sleeve 166 carries a flange 168 with a plurality of holes 170 therealong, including a rearwardmost hole 172 which corresponds to an extended position of bale keeper 180, shown in broken lines in FIG. 4. Holes 170 are each alignable with a hole in a bracket 174 connected to support arm 160. Bracket 174 carries pin 176 passing through bracket 174, and which is biased by spring 178 toward flange 168. Thus, when any hole 170 is aligned with the hole in bracket 174 through which pin 176 passes, pin 176 will be automatically urged into such hole 170. Sleeve 166 with its flange 168, and bracket 174 with its biased pin 176, are collectively referred to as a keeper retainer, since such component can retain bale keeper 180 (by virtue of its attachment to sleeve 166) in the retracted position shown in solid lines in FIG. 4, the extended position shown in broken lines in FIG. 4, or various positions therebetween corresponding to the positions of holes 170 in flange 168. It should be noted that sleeve 166 has an opening 167 in a lower end thereof as shown in FIG. 4, for the purpose of allowing debris such as hay or the like, which may otherwise become trapped between outer sleeve 166 and inner sleeve 165 to fall out opening 167.

The frame of loader 110 is additionally provided with a skid 185, having a slightly sloping forward end 185a, and a sloping rearward end 186. Two removable stop pins 188 are provided which are conveniently attached by respective chains 190 to member 186 of the frame, to prevent loss of stop pins 188. Stop pins 188 can be passed through respective sets of aligned holes in plates 138 as shown in FIGS. 1 through 5, in order to retain spike 140 in the forward position. Alternatively, either one of the stop pins 188 can be passed through a set of aligned holes 194 in plate 138, in order to retain spike 140 in either sideways position in which spike 140 abuts a corresponding stop 196 (each of which prevent spike 140 from swinging rearward beyond a corresponding sideways position abutting such stop 196). Stops 196 and pins 188 in conjunction with the portion of plates 138 with the openings therein, are collectively referred to as stop means which can releasably retain spike 140 in each of the forward and sideways positions, as well as prevent rearward movement of spike 140 from either of the sideways positions.

The round bale handler 110 as described is typically made of sufficiently strong steel, with various elements being assembled in a manner which will be evident to one skilled in the art in light of the above description. It will also be appreciated that spike 140 has the front portion 149 (that portion of the spike 140 which extends forward of bale keeper 180 when in the extended position shown in FIG. 4) of sufficient length such that the front portion 149 can penetrate through the axis of a typical round bale, such as round bale 196 shown in FIG. 1, which may be handled by the apparatus. Such a round bale again typically has a length of about 4 to 6 feet, although it is not restricted to such size.

In use, the preferred embodiment of the handler 110 is attached to a front end of an implement such as front end loader 102 as shown in FIG. 1, or the 3-point hitch as shown in FIG. 2, and in the manner previously described. The height or angle of spike 140 is adjusted by operating the implement in a well known manner. Prior to loading a bale 196 on spike 140, the operator first ensures that bale keeper 180 is in the retracted position, and pins 188 are in respective sets of holes 191, as shown in FIG. 1. The prime mover 108 is then driven forward until the front portion 149 of spike 140 penetrates through the axis of bale 196, and extends substantially along the entire length of it so that bale 196 abuts bale keeper 180. Bale 196 can then be elevated and transported by operation of front end loader 102 and prime mover 108 in a well known manner. Following elevation of bale 196, if desired, a plastic bag can be drawn over it if the bale is a high moisture bale, to facilitate silaging. Such an operation will generally require two men. However, the plastic bag can be very readily drawn over the end of round bale 196 abutting bale keeper 180 with minimal interference by any parts of loader 110. That is, the plastic bag can be drawn to almost a completely closed position around bale 196. Bale 196 can then be transported for storing. Where a bag has not been drawn over bale 196 it can then be transported to a desired position for unrolling. The positioning of the bale 196 adjacent bale keeper 180 when in the retracted position, ensure that bale 196 is close to tractor 108 thereby minimizing the chances of a dangerous situation arising whereby the tractor 108 may be tilted as a result of the weight of bale 196 (which again can typically weigh about 2 tons).

To unroll bale 196, the operator of tractor 108 first ascertains in which direction bale 196 is impaled on spike 140, so that he can determine in which direction spike 140 must swing to unroll bale 196. For example, as shown in FIG. 1, spike 140 must swing to the right from the operator's point of view on tractor 108 if he wishes to first unroll bale 196 in a direction reverse of that in which it was originally rolled. Tractor 108 is then backed up either before or after the operator ascertains the foregoing, a sufficient distance so that a rear end 197 of bale 196 is adjacent the extended position of bale keeper 180, again shown in broken lines in FIG. 4. Bale keeper 180 can then be slid to its extended position and retained therein by means of pin 176 passing through hole 172, as already described. At the same time, or after or prior to the last step, the stop means is adjusted so that spike 140 can swing to a first sideways position in which bale 196 is to be unrolled in reverse direction. This is accomplished preferably by removing both pins 188 from respective sets of holes 191. The operator also uncuts strings (not shown) on bale 196 which are typically present to retain the bale in a rolledup form. The operator again mounts tractor 108 and applies a slight downward pressure to bale 196 by operating the implement (again front end loader 102 in FIG. 1, and 3-point hitch in FIG. 2) in a well known manner. In the case of the implement being front end loader 102 as in FIG. 1, the front wheels of tractor 108 are cranked in a direction opposite that to which spike 140 must swing relative to the frame of loader 110, and the tractor 108 placed in forward gear. By continuing such a procedure, spike 140 will then swing rearward to the first sideways position, which is to the right of tractor 108 as viewed by the operator of it. In this regard, it is to be understood that reference to swinging of spike 140 is a relative term and not an absolute one, since in fact by the foregoing procedure and other procedures to be described, spike 140 and front end loader 102 will in most cases, both turn and swing to some extent with respect to one another. When spike 140 is in the first sideways position, it will be prevented from further rearward movement by its abutting a stop 192. The driver may then dismount and position a stop pin 188 in a set of holes 194 adjacent the first position of spike 140, in order to removably retain spike 140 in such first position. However, this will only be required in situations where tractor 108 is to be driven in reverse gear due to the direction in which bale 196 was first impaled on spike 140. Unrolling of bale 196 shown in FIG. 1 though, now takes place in the reverse direction from which it was originally rolled, simply by placing tractor 108 in forward gear. Bale keeper 180, by being in the extended position, retains bale 196 at a sufficient distance from the side of tractor 108 to avoid being run over by the wheels of it. In this regard, it will be understood that any particular bale handler as described is constructed so that there will be an extended position of bale keeper 180 sufficently far along spike 140, such that the bale to be unrolled will avoid the wheels of the typical prime mover(s) with which the handler is to be used.

Preferably, bale 196 is only partially unrolled in the reverse direction, and is further unrolled by operating and turning tractor 108° substantially 180 with respect to the spike (although again both tractor 108 and spike 140 will tend to turn and swing), so that spike 140 is in the second sideways position abutting a stop 192. The second sideways position is to the left of tractor 108 as viewed by the operator of it. Bale 196 is then again held against the surface by front end loader 102 and tractor 108 placed in forward gear, so that the bale unrolls in the direction in which it is rolled. The shape of bale keeper 180 as previously described, allows spike 140 to approach closer to the ground (and hence permits bale 196 to be more completely unrolled) than would otherwise be possible if bale keeper 180 was symmetrically dimensioned about spike 140, while still providing good restraint on rearward movement of a bale on spike 140. At the same time skid 185 reduces the chances of the loader 110 from becoming caught or "hung up" on the ground.

It will be appreciated of course that bale 196 could be entirely unrolled in the direction in which it is rolled if desired. However, the above procedure is preferred since it tends to unroll the bale more evenly and reduces clumping of the hay. In addition, from the above description, it will be appreciated how a similar procedure can be carried out utilizing handler 110 attached to a 3-point hitch as shown in FIG. 2. Furthermore, in view of the construction of bracket 120 already described, it will appreciated how handler 110 can be connected to implements with different spacing and sizing of their respective arms.

Figure 6:
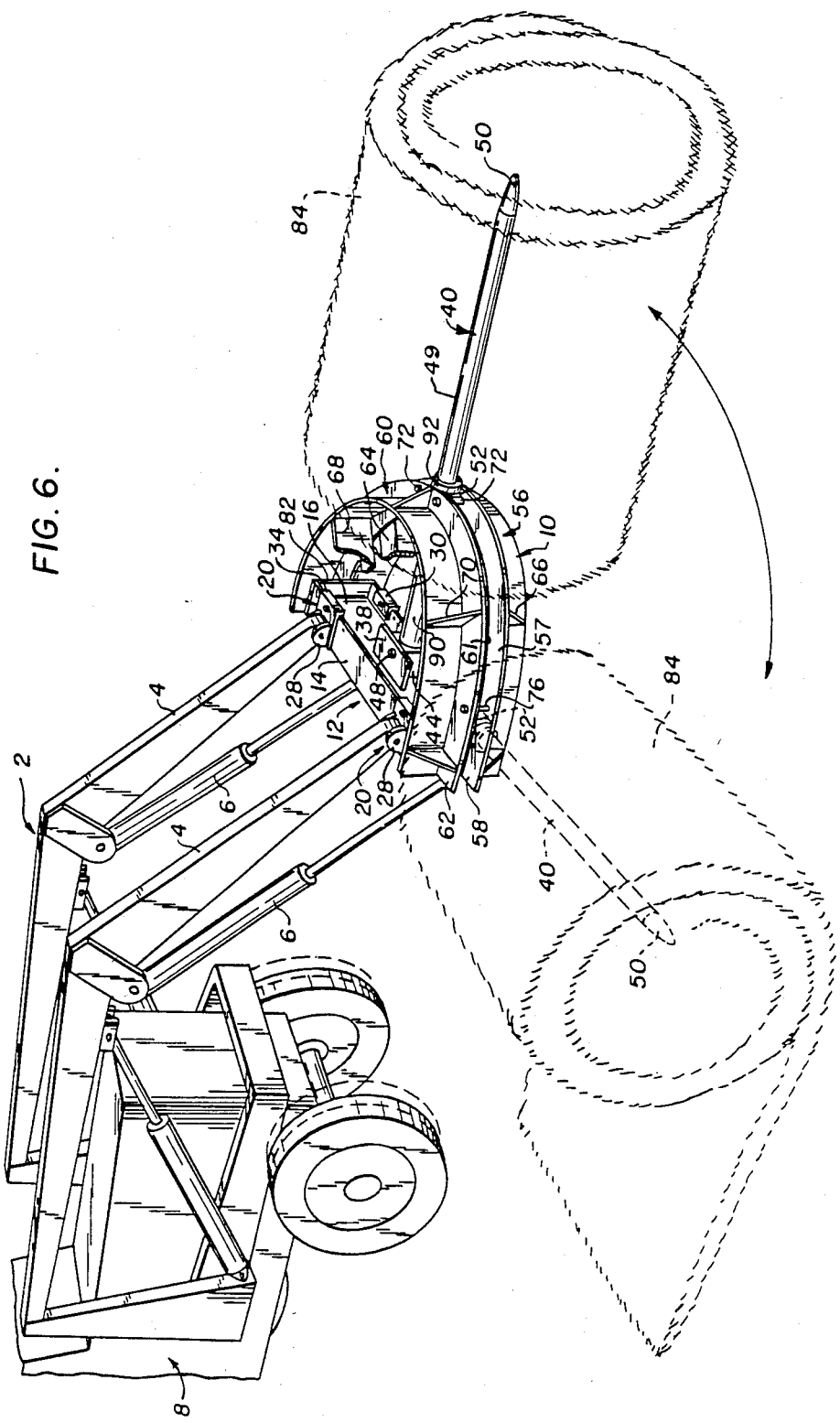
FIG. 6 is a perspective view similar to FIG. 1 but showing an alternate embodiment of the handler.
Figure 7:
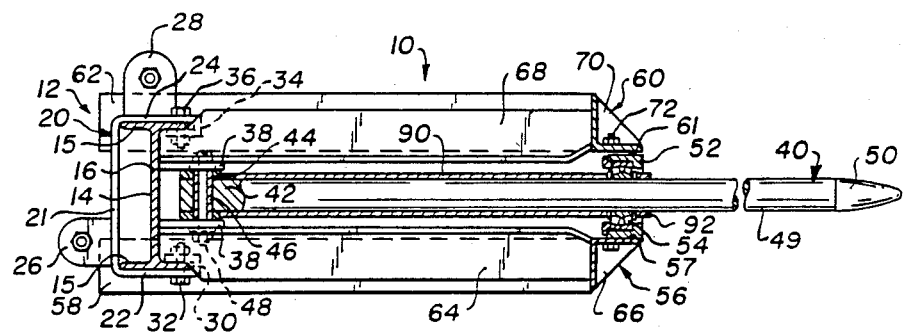
FIG. 7 is a vertical cross section along the line 7—7 of FIG. 6.
Figure 8:
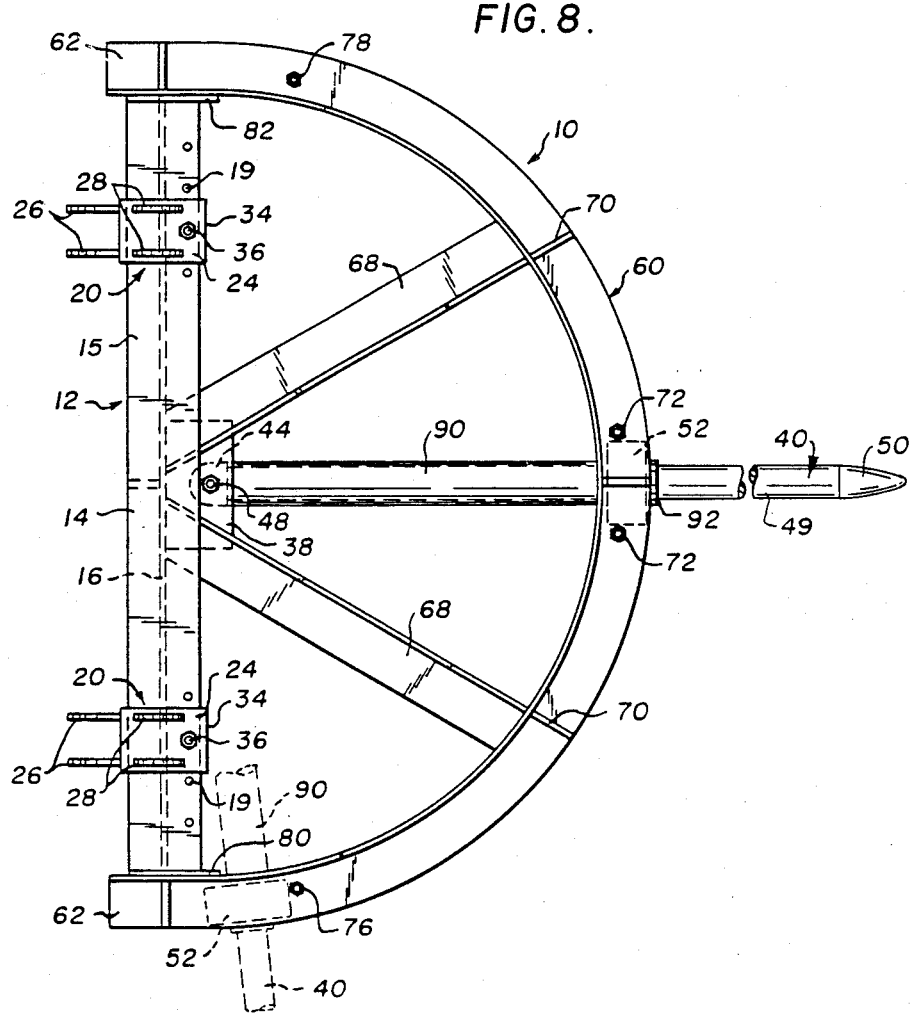
FIG. 8 is a top plan view of the handler of FIG. 6.

An alternate embodiment of the invention as shown in FIGS. 6 through 8, will now be described. In many respects this embodiment is similar to that of FIGS. 1 through 5, but differs primarily in the absence of bale keeper 180 and associated components, and support arm 160. Referring to the drawings, the round bale hanlder of this embodiment is generally numbered 10. FIG. 6 shows handler 10 attached to a front end of lift arms 4 and tilt arms 6 of an implement, namely a front end loader 2, which is in turn attached at its rear end to a prime mover, namely a tractor 8. In this regard, it will be noted that terms such as front, rear, upward, or downward or the like are again relative only and are used particularly with reference to the device when connected through an implement or the like to a prime mover as shown in the drawings.

Handler 10 is constructed of a frame which includes a rear member 12. Rear member 12 includes I-beam 14 connected to and extending between rear ends 58 and 62 of semi-circular guides 56 and 60 which will be described in more detail later. I-beam 14 includes parallel webbings 15 connected by webbing 16.

Two brackets 20 are slidably mounted on I-beam 14, each including facing portions 22 and 24 adjacent respective opposed webs 15, and interconnecting portion 21. Each slide bracket 20 further includes portions 30 and 34 welded or otherwise integrally attached to portions 22 and 24 respectively so as to slidably retain slide bracket 20 upon I-beam 14. Aligned holes are provided in portions 22 and 30, as well as portions 24 and 34, which permit passage of repective bolts 32 and 36 therethrough as well as through any of a plurality of holes 18 and 19 repectively. By means of the foregoing bolt and hole arrangements, the slide brackets 20 can be positioned at any of a plurality of positions along I-beam 14, each corresponding to the position of a corresponding pair of holes 18 and 19. Each slide bracket 20 further includes a pair of ears 26 and a pair of ears 28, each ear being provided with a hole therein such that each pair can accommodate a bolt or pin therethrough to attach each slide bracket 20 to an implement such as the front end loader 2. Typically, ears 26 would be attached by means of bolts or roll pins to tilt arms 6 of the front end loader 2, while each pair of ears 28 would be attached to the front end of lift arms 4 of the front end loader 2. However, such an arrangement can be reversed if desired.

Two plates 38 extend forwardly from webbing 16 of I-beam 14, each plate 38 being provided with a hole aligned with that on the other plate 38 so as to accommodate bolt 48 therethrough. Bolt 48 retains a pivot pin 46 in position between plates 38. A spike 40 is provided which includes a front portion 49 with a pointed front end 50, as well as a rear portion 41 with a rear end 42 pivotally mounted upon pivot pin 46. The front portion is that portion extending forward (or to the right in FIG. 2) of a collar 92, to be described, while rear portion 41 is the remainder of spike 40. By virtue of the foregoing mounting of spike 40, spike 40 is able to swing between a forward position shown in solid lines in FIGS. 6 and 9, and opposed first and second sideways positions each substantially 90° from the forward position, shown in broken lines in FIGS. 6 and 8. By "substantially" 90° is again meant an angle of 90° but allowing for a variation of about plus or minus 10°.

Spike 40 is provided with a wheel 50 which contains self-aligning roller bearing 54, rotatably mounted partway therealong. Wheel 50 is maintained in position on spike 40 by collar 92 which is welded or otherwise connected to spike 40, and cylindrical sleeve 90 positioned over a rear portion of spike 40 and welded or otherwise connected to a pivot block 44 also pivotally mounted on pivot pin 46.

The frame of loader 10 is further provided with a pair of spaced parallel guides 56, 60 connected to the I-beam 14 of rear member 12 as described. Guides 56, 60 are semi-circular in shape with an L-shaped cross section as shown most clearly in FIG. 7. Guides 58, 60 are disposed forward and sideways from I-beam 14 at positions adjacent respective sides of the plane in which spike 40 swings, and between the front end 50 and rear end 42 of spike 40 as shown. Guides 56 and 60 are spaced apart a distance slightly greater than the diameter of wheel 52. By this is meant that the opposed surfaces 57 and 61 of guides 56 and 60 respectively, are spaced apart a distance slightly greater than the diameter of wheel 52. As a result of the foregoing arrangement wheel 52 can roll freely on either guide 56 and 60, and more specifically on either opposed surface 57 and 61 thereof respectively, when the spike 40 swings. Of course normally gravity will cause wheel 52 to rest upon surface 57 and roll thereupon. However, when downward pressure is applied to a round bale, such as round bale 84, by utilizing front end loader 2, spike 40, due to its length, will tend to flex upwardly somewhat until wheel 52 contacts surface 61. When spike 40 swings at such time, then of course wheel 52 will roll on surface 61 of guide 60. In the foregoing manner as well, guides 56 and 60 provide downward and upward support, respectively, for the spike 40 when member 14 is connected to prime mover 8 to implement 2, and the spike is in the forward or sideways positions, or any position therebetween.

Guide 56 is reinforced in its position by means of angle iron spokes 64, and gussets 66 connected to one of the plates 38 and I-beam 14, whereas guide 60 is likewise reinforced by means of angle iron spokes 68 and gussets 70. The frame of loader 10 is additionally preferably provided with two parallel skids (not shown), which are simply flat, elongated, metal sheets, each positioned inwardly adjacent an inwardmost position of a corresponding slide bracket 20. Each skid extends between and beneath I-beam 14 and guide 56, as well as beneath spokes 64. The purpose of the skids is the same as that for skid 184 of the preferred embodiment of FIGS. 1-5, that is to minimize the chance that the loader 10 will get hung-up or caught on mounds or other features on the surface on which a bale is being unrolled, as the loader approaches such surface during the unrolling operation to be described.

Two removable stop pins 72 are provided each of which can pass through a corresponding set of aligned holes in portions 57 and 61 of guides 56 and 60 respectively. The holes for stop pins 72 are arranged such that stop pins 72 when inserted therein are spaced apart a distance somewhat slightly greater than the diameter of wheel 52 so that stop pins 72 can releasably retain spike 40 in the forward position. Plates 80 and 82 prevent spike 40 from swinging rearward beyond respective sideways positions. Removable stop pin 76 which passes through a set of aligned holes in portions 57 and 61 of guides 56 and 60 respectively, in conjunction with plate 80 serves to releasably retain spike 40 in a corresponding sideways position, while removable stop pin 78 in conjunction with plate 82 serve to releasable retain spike 40 in the other corresponding sideways position thereof. Removable stop pins 72, 76, 78 and plates 80 and 82 are collectively referred to as stop means which releasably retain spike 40 in each of the forward and sideways positions. All of the stop pins 72, 76, 78 may be attached to the guide 60 by means of chains or wires so as to prevent loss of them.

The round bale handler of the alternate embodiment described is again typically made from sufficiently strong steel, with various pieces preferably being interconnected by means of welding. A means of constructing the loader will be evident from the above description. In particular though, it might be noted that sections 30 and 34 of slide brackets 20 are welded to respective sections 22 and 24 of each slide bracket 20, following positioning of such slide bracket adjacent I-beam 14. It will also be appreciated of course, that front portion 49 of spike 40 is made of a sufficient length such that front portion 49 can penetrate through the axis of a round bale 84 and extend substantially along the entire length of such axis of round bale 84. This will mean that front portion 49 of spike 40 will be substantially equal in length to a typical round bale which might be handled by the apparatus (typically, although not restricted to, about 4 to 6 feet in length).

In use, the handler 10 is attached to a front end of an implement such as front end loader 2 previously connected to tractor 8, in a manner previously described and stop pins 72 are placed in their respective holes. When it is desired to elevate or transport a round bale 84, the operator simply operates front end loader 2 in a well-known manner to adjust the height and angle of spike 40 to penetrate through the axis of round bale 84. Tractor 8 is then driven forward until the front portion 49 of spike 40 penetrates through the axis of bale 84 and extends substantially along the entire length of it. Bale 84 can then be elevated by operating front end loader 2 again in a well known manner. At such point, if desired, a plastic bag can be drawn over bale 84, which in that case would be a high moisture bale to facilitate silaging. Such an operation will again generally require two men. It will be noted though, that the plastic bag can again be very readily drawn over the end of the round bale closest to guides 56 and 60 with minimal interference by such guides, due in part to their semi-circular shape. That is, the opening of the plastic bag could be drawn to a position almost completely adjacent wheel 52. Bale 84 could then be unloaded or transported if desired, or stacked for storage. More importantly though, bale 84 can be transported to a position for unrolling.

To unroll bale 84, the operator of tractor 8 first ascertains in which direction bale 84 is impaled on spike 40 so that he can determine in which direction spike 40 must swing to unroll bale 84. For example, as shown in FIG. 6, spike 40 must swing to the right (as viewed by an operator in tractor 8) relative to the frame of handler 10 if unrolling of bale 84 is to be accomplished in the direction in which it is rolled. If the operator had impaled bail 84 from the opposite end than that shown in FIG. 1, then spike 40 would have to swing in the opposite direction relative to the frame of handler 10 (unless the operator wishes to unroll the bale by putting the tractor in reverse following obtaining spike 40 in the sideways position, or wishes to unroll the bale in the reverse direction to which it was rolled, as described in connection with use of the preferred embodiment). Upon ascertaining the foregoing, the operator dismounts from tractor 8 and removes the appropriate stop pin 72 and stop pin 76 or 78 such that spike 40 can swing in the appropriate direction relative to the frame. The operator also uncuts strings (not shown) on bale 84 which are typically present to retain the bale in a rolled up form. The operator again mounts tractor 8 and then applies a slight downward pressure to bale 84 by operating front end loader 2 in a known manner. The front wheels of tractor 8 are then cranked in the opposite direction to which spike 40 must swing relative to the frame of loader 10, and the tractor 8 placed in forward gear. In this regard, it is to be understood that the reference to swinging of spike 40 is again a relative term and not an absolute one, since that in fact by the foregoing procedure spike 40 and front end loader 2 will in most cases, both turn and swing to some extent with repect to one another. The foregoing operation is continued until spike 40 contacts either plate 80 or 82, but in the particular example of FIG. 1, this will be plate 80. The driver may then dismount and position removable stop pin 76 or 78 through its respective set of holes in guides 56 and 60 (although again in the particular example of FIG. 1, this will be stop pin 76), such being required only if the tractor will be driven in reverse.

The driver then again mounts tractor 8 which is now substantially 90° to its initial position, and commences unrolling bale 84 by placing tractor 8 in forward gear. It will be appreciated of course that the operator of tractor 8 need generally not concern himself in the field with the direction in which bale 84 is being impaled. This is so since spike 40 can swing to either of the two opposed sideways positions, and in addition since once spike 40 is in either such sideways position, tractor 8 can be placed in reverse gear should such be neccessary at that time for unrolling bale 84. It should also be noted that the method of partially unrolling a bale in the reverse direction to which it has been rolled, described in connection with the preferred embodiment, can also be used on the embodiment of FIGS. 6 to 8.

Loader 10 described above can be adapted to front end loaders or other similar devices wherein the arms might be spaced varying distances apart. This will be most clearly seen by referring to FIG. 3. If it is desired to adapt the loader 10 to a front end loader wherein the set of lift arms 4 and the set of tilt arms 6 are spaced further apart than those for which brackets 20 are set up as shown in FIG. 2, then bolts 32, 36 and associated nuts may simply be unfastened, and each of the brackets 20 slid away (or toward one another where the arms are closer together) from one another along I-beam 14 until the holes in portions 22 and 30, and portions 24 and 34, are aligned with other sets of holes 18 and 19 respectively. Bolts 32 and 36 may then be reinserted through such aligned holes and the corresponding nuts retightened thereon. In addition though, slide brackets 20 need not be equally spaced about the lengthwise centre of I-beam 14 and could be offset with respect thereto so that the centre of I-beam 14 will be offset with respect to the centre of the front end loader 2. Such an arrangement can provide more sideways clearance on one side of the round bale handler, and hence increased safety under certain conditions.

Various modifications to either embodiment described above can of course be made. Such modifications include providing any of known remote control means for removing or inserting any of the pins or equivalent means. Furthermore, if desired a hydraulic cylinder or motor could be connected between the frame of the handler and the spike, in order to swing the spike to a sideways position while the frame and tractor continue to travel in a straight line.

When either embodiment described is in use on a front end loader attached to a tractor, it may also be desirable to utilize a conventional non-swinging spike attached to a rear three point hitch on the tractor, so that two bales can be carried simultaneously. Such an arrangement assists in maintaining the same centre of overall balance as when no bales are carried. This minimizes the possibility of the tractor tipping over. It should also be noted that although the embodiments described have been specifically designed for handling and unrolling round bales, they could also be used to handle (i.e. move) other material such as coils of wire or the like.

As well be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:
1. A round bale handler for use with a prime mover, comprising:
   (a) a frame having a rear member;
   (b) a spike having:
      (i) a pointed front portion so as to readily penetrate the bale;
      (ii) a rear portion pivotally connected to said frame so that said spike is swingable between a forward position parallel with the normal direction of travel of the prime mover when said frame is connected thereto, and two opposed sideways positions each substantially 90° from the forward position:
      said spike being of a sufficient length and positioned on said frame such that the front portion thereof can penetrate through an axis of the bale and extend substantially along the entire length thereof to retain the bale on said spike, when said spike is in the forward and sideways positions;
   (c) stop means mounted on said frame for releasably retaining said spike in the forward position and preventing movement thereof rearward of both sideways positions;
   (d) A bale keeper moveable along the rear portion of said spike, and extending radially therefrom so as to restrain rearward movement of a bale on the front portion of said spike and which abuts said bale keeper;
   (e) a keeper retainer positioned and constructed so as to releasably retain said bale keeper in an extended and a retracted position along the rear portion of said spike, in either of which a bale can be retained on said spike abutting said bale keeper.

2. A round bale handler as described in claim 1 additionally comprising a support arm pivotally connected to an upper end of said frame, and extending and connected to, the rear portion of said spike, so as to provide upward and downward support for said spike, and wherein the extended and retracted positions of said bale keeper are forward of said support arm.

3. A round bale handler as described in claim 2 wherein said frame comprises two brackets connected to a rear end of said frame which brackets can be releasably positioned at any of a plurality of positions along the rear end of said frame, so that the frame can be connected to different sized implements on the prime mover while the position of said frame at which the rear portion of the spike is pivotally connected, remains midway between the brackets.

4. A round bale handler as described in claim 3 wherein each of the brackets comprises two sections independently slidable toward and away from one another along the rear end of said frame, so that each of said brackets can connect to each of a plurality of various width arms of respective implements.

5. A round bale handler as described in claim 2 wherein said stop means can releasably retain said spike in each of the forward and sideways positions.

6. A round bale handler as described in claim 2 wherein the retracted position is adjacent a forward end of said support arm.

7. A round bale handler as described in claim 6 wherein said bale keeper is in the form of a plate, which has at least one sighting opening therethrough, so that when the handler is connected to the prime mover and a bale is positioned on the front portion of said spike, an operator on the prime mover can observe the position of the bale through the sighting opening.

8. A round bale handler as described in claim 6 wherein said keeper retainer comprises:
   (i) a sleeve slidably mounted on the rear portion of said spike and connected to a rear side of said bale keeper to slide therewith, and having a flange extending at least part way therealong;
   (ii) a bracket connected to said support arm;
one of the flange and the bracket having a plurality of holes therealong, while the other one thereof has at least one hole therein which is alignable with the holes in the one, so that a pin can be received between such aligned holes.

9. A round bale handler as described in claim 6 wherein said bale keeper extends below said spike a distance less than that which it extends above and sideways of said spike, and which has a lower upcurving edge.

10. A round bale handler as described in claim 9 wherein said frame comprises two brackets connected to a rear end of said frame which brackets can be releasably positioned at any of a plurality of positions along the rear end of said frame, so that the frame can be connected to different sized implements on the prime mover while the position of said frame at which the rear portion of the spike is pivotally connected, remains midway between the brackets.

11. A round bale handler as described in claim 10 wherein each of the brackets comprises two sections independently slidable toward and away from one another along the rear end of said frame, so that each of said brackets can connect to each of a plurality of various width arms of respective implements.

12. A round bale handler as described in claim 10 wherein said stop means can releasably retain said spike in each of the forward and sideways positions.

13. A round bale handler as described in claim 1 wherein said frame comprises two brackets connected to a rear end of said frame which brackets can be releasably positioned at any of a plurality of positions along the rear end of said frame, so that the frame can be connected to different sized implements on the prime mover while the position of said frame at which the rear portion of the spike is pivotally connected, remains midway between the brackets.

14. A round bale handler as described in claim 1 wherein said frame also has an upper guide connected to the rear member of said frame, and disposed above and sideways therefrom at a position above the plane in which said spike swings, and between the rear and front ends of said spike, so as to provide upward support for said spike when said frame is connected to the prime mover and said spike is in the forward or sideways positions or therebetween.

15. A round bale handler as described in claim 14 wherein the lower guide is semi-circular in shape.

16. A round bale handler as described in claim 1 wherein said frame also has a pair of spaced parallel guides connected to the rear member of said frame, and disposed forward and sideways therefrom at positions adjacent respective sides of the plane in which said spike swings, and between the rear and front ends of said spike, so as to provide upward and downward support for said spike when said frame is connected to the prime mover and said spike is in the forward or sideways positions or therebetween.

17. A round bale handler as described in claim 16 wherein the rear member includes a beam extending between opposite ends of said guides.

18. A round bale handler as described in claim 16 wherein the rear member of said frame comprises two brackets adapted to connect said frame to respective arms of different sized implements on the prime mover, mounted for slidable movement along a rear end of said frame, and which can be releasably positioned at any of a plurality of positions therealong.

19. A round bale handler as described in claim 16 wherein each of said guides is semi-circular in shape.

20. A round bale handler as described in claim 19 wherein the rear member of said frame comprises two brackets adapted to connect said frame to respective arms of different sized implements on the prime mover, mounted for slidable movement along a rear end of said frame, and which can be releasably positioned at any of a plurality of positions therealong.

21. A round bale handler as described in claim 20 additionally comprising a wheel rotatably mounted on said spike between the guides, and wherein the guides are spaced apart a distance slightly greater than the diameter of said wheel, so that wheel can roll freely on either guide when said spike swings.

22. A round bale handler as described in claim 19 additionally comprising a wheel rotatably mounted on said spike between the guides, and wherein the guides are spaced apart a distance slightly greater than the diameter of said wheel, so that said wheel can roll freely on either guide when said spike swings.

23. A round bale handler as described in claim 22 wherein said stop means can releasably retain said spike in each of the forward and sideways positions.

24. A method of loading and unrolling a round bale utilizing a round bale handler as described in claim 1, connected to an implement on a prime mover, which method comprises:
   (a) initially positioning said bale keeper in the retracted position and releasably retaining it therein with said keeper retainer;
   (b) penetrating the spike in an appropriate direction through the axis of the bale so that the front portion of the spike extends substantially along the entire length thereof and the bale abuts said bale keeper, by driving the prime mover forward while said stop means releasably retains said spike in the forward position;
   (c) transporting the bale on the front portion of said spike, to another location by moving the prime mover;
   (d) then:
      (i) moving the round bale handler backward so that the rear end of the bale is adjacent the extended position of said bale keeper;
      (ii) moving said bale keeper to the extended position so as to abut the bale;
      (iii) selecting a first sideways position to which the bale will be swung from two possible opposed sideways positions each substantially 90° from the forward position; and (iv) adjusting said stop means so that said spike can swing to said selected position to be restrained from further rearward movement therefrom by said stop means;
(e) then unrolling the bale by:
(i) turning the direction of the prime mover substantially 90° with respect to said spike so that said spike is in said selected sideways position and prevented from movement rearward thereof by said stop means;
(ii) moving the prime mover while holding the bale on a surface, so that the bale unrolls.

25. A method as described in claim 24 wherein the bale is penetrated in a direction such that the bale can be unrolled in a direction reverse of that in which it is rolled, and wherein the bale is first partially unrolled in step (e) in such reverse direction, the method additionally comprising following step (e):
(f) adjusting said stop means so that said spike can swing from the first to the second sideways positions to be restrained from further rearward movement therefrom by said stop means;
(g) then further unrolling the bale, in the direction in which it is rolled, by:
(i) turning the direction of the prime mover substantially 180° with respect to said spike so that said spike is in the second sideways position, and prevented from movement rearward thereof by said stop means;
(ii) then moving the prime mover while holding the bale on the surface so that the bale unrolls in the direction in which it is rolled.

* * * * *